(12) United States Patent
Vogt

(10) Patent No.: US 11,976,951 B2
(45) Date of Patent: May 7, 2024

(54) ULTRASONIC TRANSDUCER INCLUDING SEPARATELY-EXCITABLE ELECTRO-ACOUSTIC DISCS, ULTRASONIC FLOWMETER INCLUDING THE ULTRASONIC TRANSDUCER, AND RELATED METHODS FOR OPERATING THE ULTRASONIC TRANSDUCER AND ULTRASONIC FLOWMETER

(71) Applicant: KROHNE Messtechnik GmbH, Duisburg (DE)

(72) Inventor: Michael Vogt, Bochum (DE)

( * ) Notice: Subject to any disclaimer, the term of this patent is extended or adjusted under 35 U.S.C. 154(b) by 210 days.

(21) Appl. No.: 17/448,775

(22) Filed: Sep. 24, 2021

(65) Prior Publication Data
US 2022/0099468 A1 Mar. 31, 2022

(30) Foreign Application Priority Data

Sep. 25, 2020 (DE) ..................... 10 2020 125 163.7
Sep. 25, 2020 (DE) ..................... 10 2020 125 164.5
Nov. 5, 2020 (DE) ..................... 10 2020 129 191.4
Nov. 5, 2020 (DE) ..................... 10 2020 129 196.5

(51) Int. Cl.
*G01F 1/667* (2022.01)
*G01F 1/66* (2022.01)
*H04B 11/00* (2006.01)

(52) U.S. Cl.
CPC .............. *G01F 1/667* (2013.01); *G01F 1/662* (2013.01); *H04B 11/00* (2013.01)

(58) Field of Classification Search
CPC .......... G01F 1/662; G01F 1/667; H04B 11/00

USPC ......................................................... 73/861.28
See application file for complete search history.

(56) References Cited

U.S. PATENT DOCUMENTS

| | | | |
|---|---|---|---|
| 4,051,455 A * | 9/1977 | Fowler | B06B 1/0603 367/163 |
| 4,156,158 A * | 5/1979 | Wilson | G01F 1/662 310/369 |
| 4,505,160 A | 3/1985 | Zacharias, Jr. | |
| 5,590,866 A * | 1/1997 | Cunningham | B06B 3/00 310/345 |
| 8,760,971 B2 | 6/2014 | Karl | |
| 9,491,550 B2 * | 11/2016 | Kim | H03H 9/15 |
| 10,067,099 B2 | 9/2018 | Karl | |

(Continued)

FOREIGN PATENT DOCUMENTS

DE 29509574 U1 8/1996
DE 102010027780 A1 10/2011

(Continued)

*Primary Examiner* — Nathaniel T Woodward
(74) *Attorney, Agent, or Firm* — Patrick D. Duplessis

(57) ABSTRACT

An ultrasonic transducer for an ultrasonic flowmeter includes at least one electro-acoustic element, at least one housing, at least one acoustic window and at least one control unit. The electro-acoustic element is arranged within the housing on the acoustic window such that, during operation, an ultrasonic signal generated by the electro-acoustic element leaves the housing through the acoustic window. The electro-acoustic element has at least two electro-acoustic discs. The at least two electro-acoustic discs are arranged one above the other. At least one electro-acoustic disc can be excited separately, at least temporarily, by the control unit.

16 Claims, 7 Drawing Sheets

(56) References Cited

U.S. PATENT DOCUMENTS

| | | | |
|---|---|---|---|
| 2002/0040592 A1* | 4/2002 | Getman | G01N 9/002 |
| | | | 73/54.25 |
| 2010/0011866 A1 | 1/2010 | Van Klooster | |
| 2010/0313676 A1 | 12/2010 | Straub, Jr. | |
| 2015/0160053 A1* | 6/2015 | Baumoel | G01F 1/668 |
| | | | 73/861.28 |
| 2018/0058207 A1* | 3/2018 | Song | E21B 47/005 |
| 2021/0352413 A1 | 11/2021 | Gebhart et al. | |

FOREIGN PATENT DOCUMENTS

| | | |
|---|---|---|
| DE | 102018126387 A1 | 4/2020 |
| EP | 0749005 A2 | 12/1996 |
| EP | 2148322 A2 | 1/2010 |
| WO | 2015085293 A1 | 6/2015 |
| WO | 2020083910 A1 | 4/2020 |

\* cited by examiner

ULTRASONIC TRANSDUCER INCLUDING SEPARATELY-EXCITABLE ELECTRO-ACOUSTIC DISCS, ULTRASONIC FLOWMETER INCLUDING THE ULTRASONIC TRANSDUCER, AND RELATED METHODS FOR OPERATING THE ULTRASONIC TRANSDUCER AND ULTRASONIC FLOWMETER

TECHNICAL FIELD

The invention is based on an ultrasonic transducer, in particular for an ultrasonic flowmeter, wherein the ultrasonic transducer comprises at least one electro-acoustic element, at least one housing, at least one acoustic window and at least one control unit, wherein the electro-acoustic element is arranged within the housing on the acoustic window such that, during operation, an ultrasonic signal generated by the electro-acoustic element exits the housing through the acoustic window. Furthermore, the invention relates to a method for operating an ultrasonic transducer in a measuring environment, an ultrasonic flowmeter having at least one measuring tube, having at least one ultrasonic transducer and having at least one control and evaluation unit, wherein the at least one ultrasonic transducer is designed at least as ultrasonic transmitter, preferably as an ultrasonic transmitter and receiver, and wherein the ultrasonic transducer is arranged on the measuring tube in such a way that, during operation, it emits an ultrasonic signal into the measuring tube in the direction or opposite the direction of flow of a flowing medium, as well as a method for operating an ultrasonic flowmeter.

BACKGROUND

Ultrasonic transducers known from the prior art for determining the flow velocity of a medium flowing through a measuring tube emit an ultrasonic signal with a fixed frequency and with a fixed beam width during operation, regardless of the current process situation.

In principle, the quality of an ultrasonic measurement signal passing through a medium depends on the absorption properties of the medium, the viscosity of the medium, and the current process conditions. Effects that reduce the quality of the transmission signal are, for example, the attenuation of the signal by the medium or drifting effects at high flow velocities in the case of a measurement of flowing media. In the following, an ultrasonic signal that has passed through a medium is referred to as a receive signal.

In order to avoid or reduce the disadvantages set forth above, it is an object of the present invention to provide an ultrasonic transducer that ensures an improvement in the quality of the receive signal.

SUMMARY

In addition, it is an object of the invention to provide a method for operating an ultrasonic transducer, an ultrasonic flowmeter, and a method for operating an ultrasonic flowmeter, each of which ensures an improvement in the quality of a receive signal.

According to a first teaching of the present invention, the previously described object is achieved in that the electro-acoustic element comprises at least two electro-acoustic discs, wherein the at least two electro-acoustic discs are arranged one above the other, and wherein at least one electro-acoustic disc can be separately excited by the control unit at least temporarily.

According to the invention, it has been recognized that the electro-acoustic element of an ultrasonic transducer can be modular so that it can be excited in different ways. This has the advantage that influence can be exerted on the properties of the ultrasonic signal generated during operation. In detail, the properties of the ultrasonic signal can be adapted to the properties of the medium and/or to the current process situation, whereby the quality of the receive signal can be improved as a result.

During operation, for example, exactly one electro-acoustic disc can be excited into oscillation, wherein the at least two electro-acoustic discs are connected to each other in such a way that the second electro-acoustic disc resonates, so that as a result the resonant frequency of the resonator formed by the electro-acoustic element is determined by the combination of the at least two electro-acoustic discs. In the sense of the invention, a separate excitation does not mean that a separately excited electro-acoustic disc alone oscillates freely.

The resonant frequency of the electro-acoustic element as a whole can be influenced with the design and/or control of the second electro-acoustic disc, whereby, as a result, the frequency of the generated ultrasonic signal can be varied. This is explained in more detail below for different designs.

According to a preferred design, the at least two electro-acoustic discs can be controlled separately. In this case, both electro-acoustic discs are separately connected to the control unit. During operation, the at least two discs can be excited differently, for example. It is also conceivable that the electro-acoustic discs are at least temporarily connected in parallel or in series. Particularly preferably, the at least two electro-acoustic discs are connected to the control unit in such a way that it is possible to switch between different controls of the individual electro-acoustic discs during operation.

According to a further design, the electro-acoustic element is a piezo element, i.e., an element made of a piezo-ceramic material, and/or a micro-mechanical element of a capacitive micro-mechanical ultrasonic transducer. Preferably, an electro-acoustic disc is further a piezo disc, i.e., a disc made of a piezo-ceramic material, and/or a micro-mechanical disc of a capacitive micro-mechanical ultrasonic transducer. Other electro-acoustic elements or discs are also conceivable for the implementation of the invention.

Particularly preferably, the at least two electro-acoustic discs each have a first and a second end face, wherein at least three electrodes are connected to the electro-acoustic element, wherein at least one electrode is arranged on the end face of the first electro-acoustic disc facing the acoustic window, wherein at least one electrode is arranged between the first and the second electro-acoustic disc, and wherein at least one electrode is arranged on the end face of the second electro-acoustic disc facing away from the acoustic window.

If the electro-acoustic disc is substantially cylindrical in shape, the end faces of an electro-acoustic disc correspond to the opposing base surfaces of the cylinder. These base surfaces may be circular or may also have the shape of a polygon or an ellipse.

According to one design, the first and/or the second electro-acoustic disc is polarized in the direction of the height of the cylinder. If the electrodes are positioned on the end faces, the electro-acoustic disc carries out longitudinal oscillations during operation and is mechanically deflected between the electrodes. Alternatively, transverse oscillation excitation of the electro-acoustic disc can be implemented. In this case, the electrodes are arranged laterally on the electro-acoustic element and, when a voltage is applied, oscillation takes place perpendicular to the electrodes.

Particularly preferably, at least two electrodes are arranged on at least one end face of the first and/or the second electro-acoustic disc, wherein the at least two electrodes differ in shape and/or size.

Particularly preferably, the electrodes are geometrically designed in such a way that the generated ultrasonic signal is rotationally symmetrical. According to this design, the electrodes are particularly preferably circular. In particular, the circular design is advantageous in those areas of application in which no preferred direction exists.

In addition to a symmetrical beam shape, an asymmetrical beam shape of the ultrasonic signal can also be implemented by corresponding geometric design of the electrodes.

Particularly preferably, at least two electrodes differ in their diameter.

For example, a first electrode formed as a ring electrode encircles a second electrode located inside the ring electrode. Preferably, according to this design, both electrodes are circular or elliptical in shape. According to this design, the two electrodes can be controlled individually or in parallel during operation. According to one design, only the inner electrode can be controlled during operation, or the inner electrode can be controlled in parallel with the outer electrode. It is also conceivable that only the outer ring electrode is controlled.

In addition, it is equally advantageous if at least three electrodes are arranged on the same end face of the at least one electro-acoustic disc, wherein at least two electrodes are formed as ring electrodes lying inside one another and one electrode is arranged as a substantially circular electrode inside the ring electrodes. Also in this combination, the electrodes can be driven separately or in parallel during operation.

The shape and/or size of the electrodes has an influence on the shape of the generated ultrasonic signal when the electro-acoustic disc is excited.

If the at least three separately controllable electrodes are excited differently during operation, the beam shape of the emitted ultrasonic signal can be adapted, for example, to the medium to be measured or to the current measurement situation.

Such an arrangement has the advantage that the generated ultrasonic signal can be adapted particularly flexibly to the measurement situation, whereby the quality of the received signal can be improved even further.

In addition to the ring electrode design with an internal electrode, other electrode shapes are also conceivable and advantageous. For example, a plurality of electrodes can be present on one end face, wherein, during operation, the individual electrodes can be controlled separately and/or in different combinations to adjust the beam shape, in particular the beam width, of the emitted ultrasonic signal.

According to a further design, at least one electrode is elliptical. Preferably, at least two electrodes are elliptical, with at least one elliptical electrode encircling at least one further elliptical electrode. Also according to this design, the electrodes can be controlled both separately and in parallel.

According to a further preferred design, a plurality of separately controllable electrodes is present, wherein the plurality of electrodes is arranged on the same end face of at least one electro-acoustic disc and wherein, during operation, the individual electrodes can be controlled in different combinations in order to set the beam shape, in particular the beam width, of the emitted ultrasonic signal.

In the context of the invention, a plurality of electrodes is understood to mean a number of at least three electrodes or at least four electrodes or at least five electrodes.

For example, the electrodes can be hexagonal and/or rectangular, preferably square, so that a grid with separately controllable electrodes results overall. The controlled geometric shape can be set particularly flexibly according to this design. Particularly preferably, a combination of seven or 19 hexagonal honeycombs or a combination of 4, 6, 9 or 12 squares is arranged on one end face. This design has the advantage that the beam shape can be adjusted particularly flexibly and can also be designed as an asymmetrical beam shape in addition to the symmetrical shape.

By controlling different electrodes, the shape of the ultrasonic signal can also be varied during operation. By alternatively controlling two electrode geometries, it is advantageously possible to switch between two beam shapes during operation. In this respect, this design has the advantage that the generated ultrasonic signal can be adjusted particularly well to the current measurement situation.

If the medium to be measured is a flowing medium, the ultrasonic signal emitted into the medium may not reach the receiver unit due to the drift effect. In this case, it is advantageous to increase the beam width so that high flow velocities can also be captured. In addition, superimposition of reflections on surfaces of the measuring environment, such as on the inner wall of a measuring tube, with the receive signal can be reduced if the beam width of the generated ultrasonic signal is reduced.

According to a further preferred design, at least one electrode is configured as a ground electrode, wherein the ground electrode is preferably a common ground electrode for the at least two other electrodes. Particularly preferably, the ground electrode is arranged on the end face of the electro-acoustic element facing the acoustic window. In this case, the ground electrode has the same potential as the housing. Particularly preferably, the ground electrode substantially completely covers the end face on which the ground electrode is arranged.

It is also particularly preferred if at least one depression and/or at least one gap is arranged between the at least two electrodes arranged on one end face. This design has the advantage that crosstalk between the individual electrodes can be avoided or at least reduced during operation.

According to a further preferred design, the control unit is designed and connected to the electrodes in such a way that at least two electrodes can be controlled at least temporarily with a different phase and/or amplitude. Particularly preferably, the at least two electrodes, which are controlled with a different phase and/or amplitude, are arranged on the same end face. This design has the advantage that the direction of the emitted ultrasonic signal can be influenced.

According to a particularly preferred design, at least two electro-acoustic discs have substantially the same thickness. The thickness of an electro-acoustic disc is, in the case of a cylindrical disc, synonymous with the height of the disc.

Moreover, it is also advantageous if at least two electro-acoustic discs have a different thickness. For example, the electro-acoustic disc provided for excitation may be thicker than the second electro-acoustic disc arranged on this disc.

It is also conceivable that the electro-acoustic element comprises a plurality of electro-acoustic discs, some of which have the same thickness and/or some of which have different thicknesses. These discs may be operated in parallel or in series during operation.

According to another preferred design, at least two electro-acoustic discs have the same material. For example, at least two electro-acoustic discs are formed of a piezo ceramic.

Furthermore, it is preferred if at least two electro-acoustic discs have a different material.

Particularly preferably, at least one electro-acoustic disc is connected to an adjustable load, in particular an inductive and/or capacitive load. During operation, by applying the load, an acoustic impedance can be transformed into this electro-acoustic disc, which influences the vibration of the other, actively excited electro-acoustic disc. As a result, the resonant frequency of the entire electro-acoustic element and thus the frequency of the generated ultrasonic signal can be changed. During operation, the frequency of the generated ultrasonic signal can thus be adjusted, for example, in such a way that the absorption by the medium is minimal.

It is also conceivable that a plurality of electro-acoustic discs are subjected to different loads.

For example, the adjustable load may be a gyrator. Further, the load may be a high impedance load. In addition, the load can be connected to a switch in such a way that the load can be switched on as required during operation. According to this design, it is particularly easy to switch between the emission of two different frequencies during operation.

According to a second teaching of the present invention, the object described at the beginning is achieved by a method mentioned at the beginning for operating an ultrasonic transducer in a measuring environment, in that the ultrasonic transducer is designed according to one of the designs described above, that the ultrasonic transducer emits an ultrasonic signal into a medium and that, the electro-acoustic element, in particular at least one electro-acoustic disc, is controlled in dependence on the viscosity of the medium and/or the absorption of the generated ultrasonic signal by the medium.

When it is said that the electro-acoustic element is controlled in dependence on the viscosity of the medium and/or in dependence on the absorption of the generated ultrasonic signal by the medium, it is meant that if the value of the viscosity of the medium is below a limit value, the electro-acoustic discs are controlled in such a way that the ultrasonic signal has a first frequency, if the value of the viscosity is above a limit value, the electro-acoustic discs are controlled in such a way that the ultrasonic signal has a second frequency.

Alternatively or additionally, the transmission of the ultrasonic signal through the medium can be determined at the at least two frequencies to be implemented, wherein the electro-acoustic element is then controlled in such a way that an ultrasonic signal is emitted with a frequency whose absorption is minimal.

Particularly preferably, the ultrasonic transducer can be switched between two frequencies, for example between 1 MHz and 2 MHz, during operation.

For example, the method of operating an ultrasonic transducer can be used to measure the flow of a flowing medium or also to measure the fill level.

In principle, the medium into which the ultrasonic signal is emitted may be a liquid medium or a gaseous medium.

According to a third teaching of the present invention, the object described at the beginning is achieved by an ultrasonic flowmeter described at the beginning in that the at least one ultrasonic transducer is designed according to one of the designs described above.

According to a preferred design, at least two ultrasonic transducers are present, wherein both ultrasonic transducers are designed as ultrasonic transmitters and as ultrasonic receivers and wherein both ultrasonic transducers are designed according to one of the previously described designs. The two ultrasonic transducers may be of the same design with respect to the configuration of the electro-acoustic element. Alternatively, the design of the electro-acoustic elements of the two ultrasonic transducers may differ.

According to one design, the ultrasonic transducers differ with respect to the number and/or geometries of the electrodes.

Particularly preferably, a relationship between the viscosity of the medium and/or the absorption of the ultrasonic signal by the medium and the actuation of the electro-acoustic element is stored in the control and evaluation unit.

Preferably, the ultrasonic flowmeter comprises a further sensor unit for capturing the viscosity of the medium.

According to a further design, a correlation between the flow velocity and/or the viscosity of the medium to be measured or the attenuation of the ultrasonic signal by the medium to be measured and the control of the electrodes is stored in the control and evaluation unit.

According to a fourth teaching of the present invention, the object described at the beginning is achieved by a method described at the beginning for operating an ultrasonic flowmeter in that the ultrasonic flowmeter is constructed according to one of the designs described above and that the at least one ultrasonic transducer is operated according to a method described above.

According to one design, the ultrasonic flowmeter according to the invention comprises at least two ultrasonic transducers, wherein both ultrasonic transducers are configured as ultrasonic transmitter and as ultrasonic receiver, wherein both ultrasonic transducers are configured according to one of the designs described above, wherein both ultrasonic transducers are configured identically with respect to the configuration of the electro-acoustic element, and wherein the two ultrasonic transducers are controlled identically during operation.

In detail, the two ultrasonic transducers are controlled such that they emit the same frequency. According to this design, the ultrasonic transducers operate at the same frequency in transmit mode and in receive mode.

According to a further design of the method, a first ultrasonic transducer transmits an ultrasonic signal at a first frequency $f_1$ and a second ultrasonic transducer transmits an ultrasonic signal at a second frequency $f_2$. According to this embodiment, the ultrasonic transducers operate at different frequencies in transmit mode and in receive mode. Specifically, the first ultrasonic transducer is operated in receive mode such that it receives a frequency $f_2$, and the second ultrasonic transducer is operated in receive mode such that it receives a frequency $f_1$.

According to a further design, the control and evaluation unit controls at least two electrodes in dependence on at least one state variable, wherein the control of the at least two electrodes is changed, during operation, in dependence on the at least one state variable.

The relevant state variable is the flow velocity of the flowing medium and/or the viscosity of the medium and/or the absorption of the ultrasonic signal by the medium.

According to one design, the amplitude and/or the frequency spectrum of a received signal is analyzed by the control and evaluation unit. Depending on the value of the transmitted intensity and/or the frequency spectrum of the received signal, the electrodes connected to the electro-acoustic element are controlled.

The threshold value for switching the control of the electrodes depends on the medium to be measured. Since gases have a lower sound velocity than liquids, which means that the sound waves travel for a longer time, the drift effect is much stronger with gaseous media than with liquid media. The threshold value for switching to a wider beam shape is therefore preferably lower for gaseous media than for liquid media.

Moreover, at least one additional sensor for measuring at least one further state variable of the system, for example for measuring the viscosity of the medium, may be present.

According to a preferred design, at least two electrodes arranged on the same end face of an electro-acoustic disc are controlled in parallel at least from time to time. According to this design, the adjustment of the beam shape is particularly flexible.

In addition, it is further preferred if at least two electrodes are at least temporarily controlled with different phase and/or with different amplitude. In particular at high flow velocities, the direction of the emitted ultrasonic signal can be influenced in such a way that the emitted ultrasonic signal is deflected against the direction of flow. For this, for example, at least two electrodes that are arranged one behind the other in the direction of flow are controlled with a time offset against the direction of flow. In this way, the drift effect can be counteracted in an advantageous manner by deflecting the ultrasonic signal.

According to a further preferred design of the method, at least two ultrasonic transducers are provided, wherein the at least two ultrasonic transducers are designed as an ultrasonic transmitter and as an ultrasonic receiver and wherein both ultrasonic transducers are designed according to one of the designs described above, wherein both ultrasonic transducers are designed identically with respect to the design of the electro-acoustic element and wherein the two ultrasonic transducers are controlled identically during operation.

Alternatively, the two ultrasonic transducers can also have different electro-acoustic elements and/or be controlled during operation in such a way that they have a different frequency and/or a different beam width. The design has the advantage that the overall bandwidth of the flow measurement can be increased.

According to a further design, the ultrasonic transducers are operated differently in transmit mode than in receive mode. For example, the ultrasonic transducers can emit an ultrasonic signal with a narrow beam width and then be operated by switching the control in such a way that they have a wider acoustically effective receiving area.

BRIEF DESCRIPTION OF THE DRAWINGS

There is now a plurality of possibilities for designing and further developing the ultrasonic transducer according to the invention, the ultrasonic flowmeter according to the invention and the methods according to the invention. For this, reference is made to the description of the following embodiments together with the drawings.

DETAILED DESCRIPTION

Figure 1A:
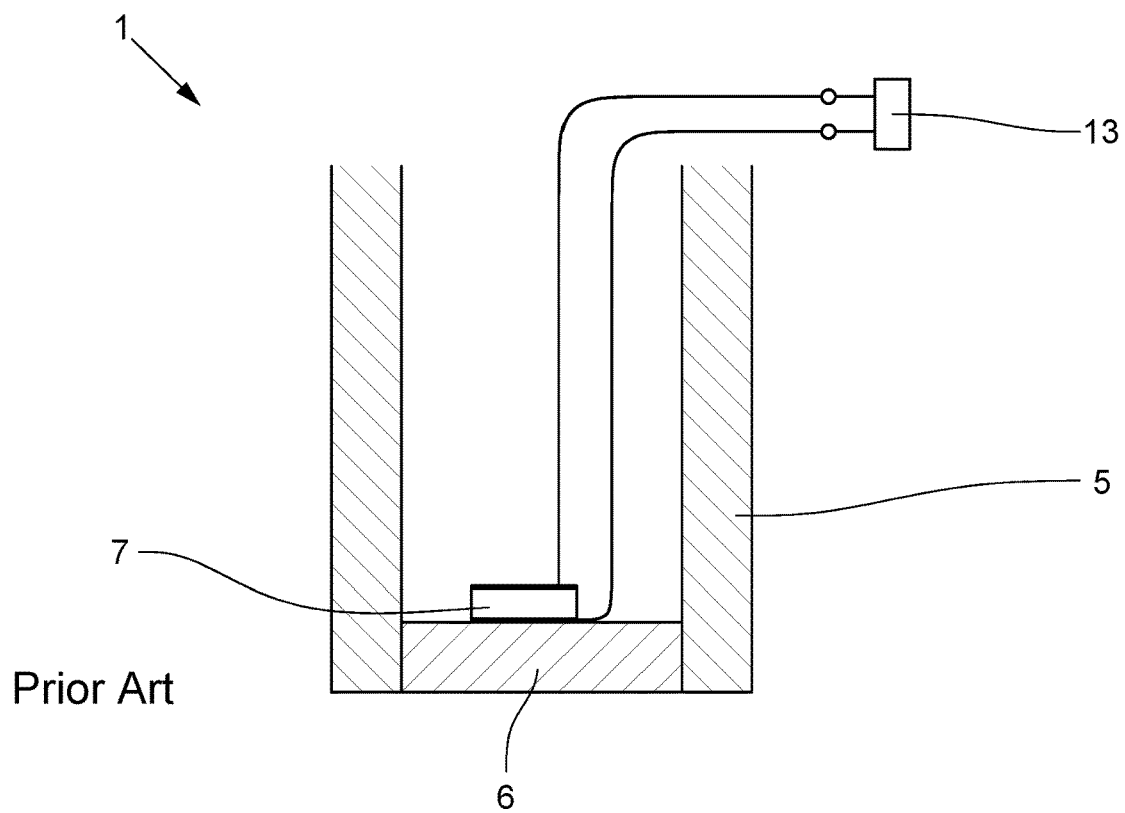
FIG. 1a illustrates an ultrasonic transducer known from the prior art.

FIG. 1a shows an ultrasonic transducer 1 known from the prior art, which is suitable for use in an ultrasonic flowmeter 3. The ultrasonic transducer 1 has a housing 5 and an acoustic window 6. In addition, an electro-acoustic element 7 is provided, which is configured as a piezo element and which is arranged on the acoustic window 6. During operation, a voltage is applied to the electro-acoustic element 7, causing the electro-acoustic element 7 to oscillate. During operation, the transmission of this oscillation through the acoustic window 6 generates an ultrasonic signal in the medium located in front of the acoustic window 6.

Figure 1B:
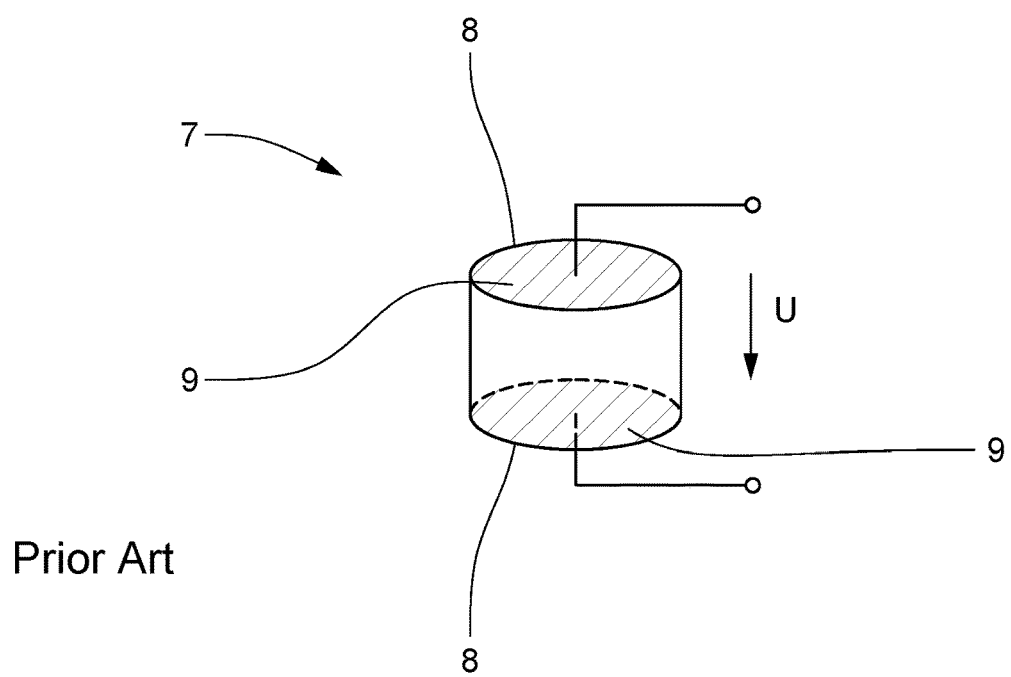
FIG. 1b illustrates a piezo element known from the prior art.

FIG. 1b shows the electro-acoustic element 7 in an enlarged view. Electrodes 9 are arranged on the end faces 8 of the electro-acoustic element 7, to which a voltage is applied during operation to excite the electro-acoustic element 7. In principle, the shape of the electrodes 9 determines the shape of the ultrasonic signal emitted by the electro-acoustic element 7, in particular the width of the ultrasonic cone. The frequency of the generated ultrasonic signal depends on the height of the electro-acoustic element. Typically, an electro-acoustic element is excited so that it resonates. In this case, the electro-acoustic element oscillates in such a way that the height of the electro-acoustic element corresponds to an integer, preferably odd, multiple of half the wavelength.

Figure 2:
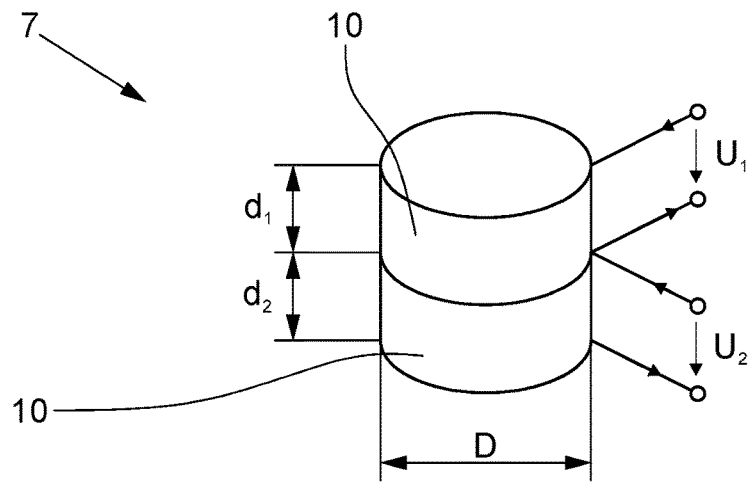
FIG. 2 illustrates a first embodiment of an electro-acoustic element according to the invention.

FIG. 2 shows a first embodiment of an electro-acoustic element 7 according to the invention, which is designed as a piezo element. The electro-acoustic element 7 has two electro-acoustic discs 10 in the form of piezo discs. In the illustrated embodiment, the electro-acoustic discs 10 have the same thickness as well as the same material. In addition, the electro-acoustic discs 10 are separately controllable during operation. In detail, a voltage can be individually applied to the electro-acoustic discs 10. During operation, the electro-acoustic discs 10 can, in this respect, be subjected to the same voltage or also to different voltages.

Figure 3:
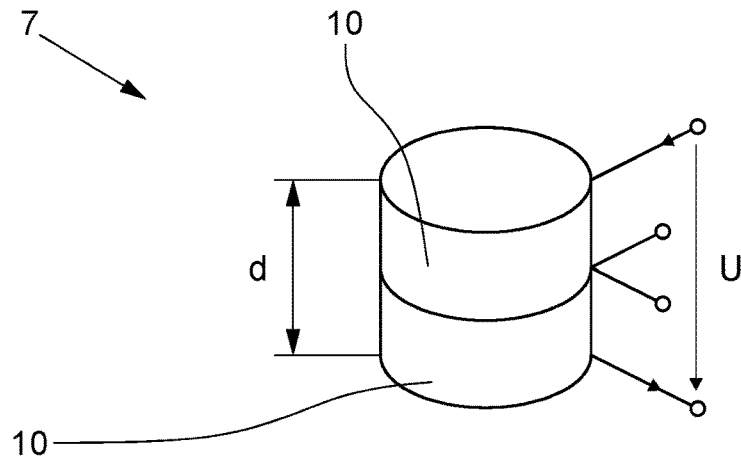
FIG. 3 illustrates a further embodiment of an electro-acoustic element according to the invention.

FIG. 3 shows a further embodiment of an electro-acoustic element 7 in the form of a piezo element, wherein the electro-acoustic element 7 also has two electro-acoustic discs 10 of the same thickness. As an alternative to separately controlling the individual electro-acoustic discs 10, the electro-acoustic discs 10 can also be excited together.

Figure 4:
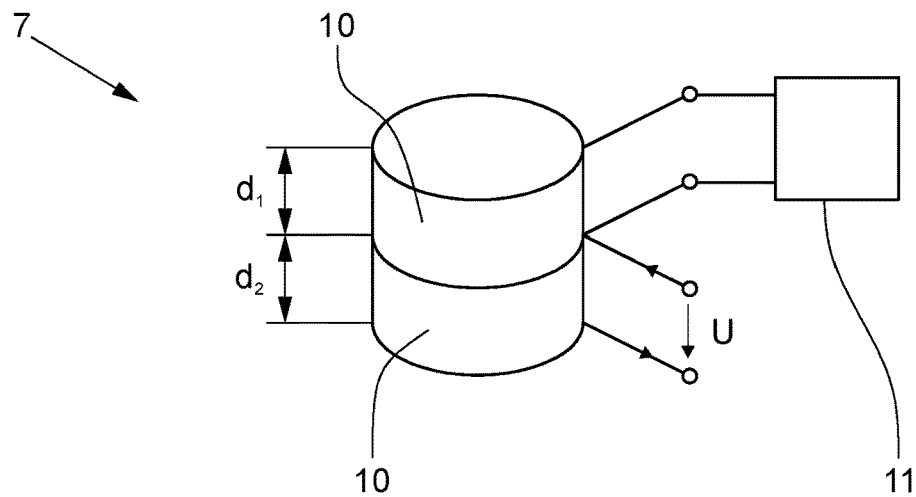
FIG. 4 illustrates a further embodiment of an electro-acoustic element according to the invention.

FIG. 4 shows another embodiment of an electro-acoustic element 7 in the form of a piezo element, wherein the electro-acoustic element 7 has two electro-acoustic discs 10 in the form of piezo discs. During operation, the lower electro-acoustic disc is excited by applying a voltage. The upper disc is connected to an electrical load 11 which, during operation, affects the oscillation of the upper electro-acoustic disc 10. The resonant frequency of the combination of the two electro-acoustic discs 10 can be tuned in this way during operation, so that the frequency of the generated ultrasonic signal can also be adjusted.

Figure 5:
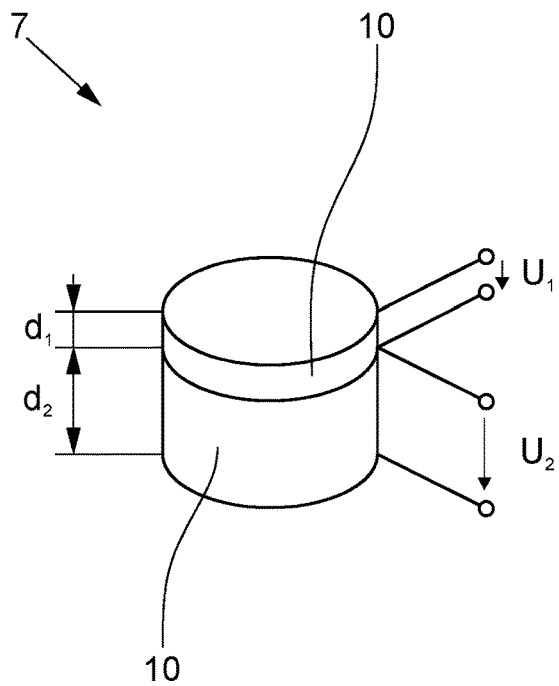
FIG. 5 illustrates a further embodiment of an electro-acoustic element according to the invention.

FIG. 5 shows an embodiment of an electro-acoustic element 7 according to the invention in the form of a piezo element, wherein the electro-acoustic element 7 has two electro-acoustic discs 10 in the form of piezo discs. In contrast to the embodiments shown in FIGS. 2 to 4, the electro-acoustic discs 10 have different thicknesses. The lower electro-acoustic disc 10 has a thickness $d_2$ that is greater than the thickness $d_1$ of the upper electro-acoustic disc.

Figure 6:
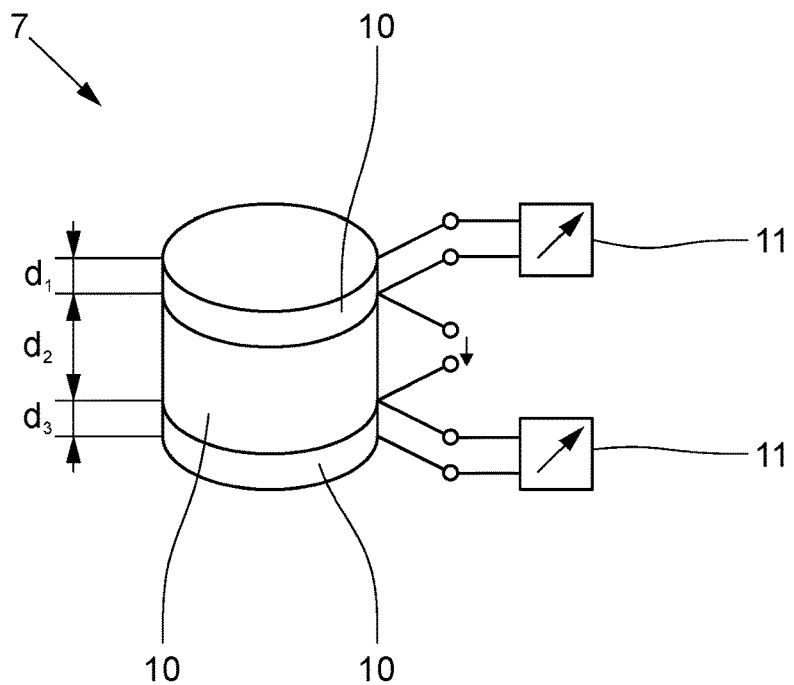
FIG. 6 illustrates a further embodiment of an electro-acoustic element according to the invention.

In FIG. 6, another embodiment of an electro-acoustic element 7 in the form of a piezo element is shown, wherein the electro-acoustic element 7 comprises three electro-acoustic discs 10 in the form of piezo discs. The illustrated embodiment is configured such that, during operation, a voltage is applied to the central electro-acoustic disc 10, which has a greater thickness $d_2$ than the two outer electro-acoustic discs 10, to excite the electro-acoustic element 7. The two outer electro-acoustic discs are each connected to an adjustable load by which, during operation, the oscillation of the combination of the three electro-acoustic discs can be influenced.

Figure 7:
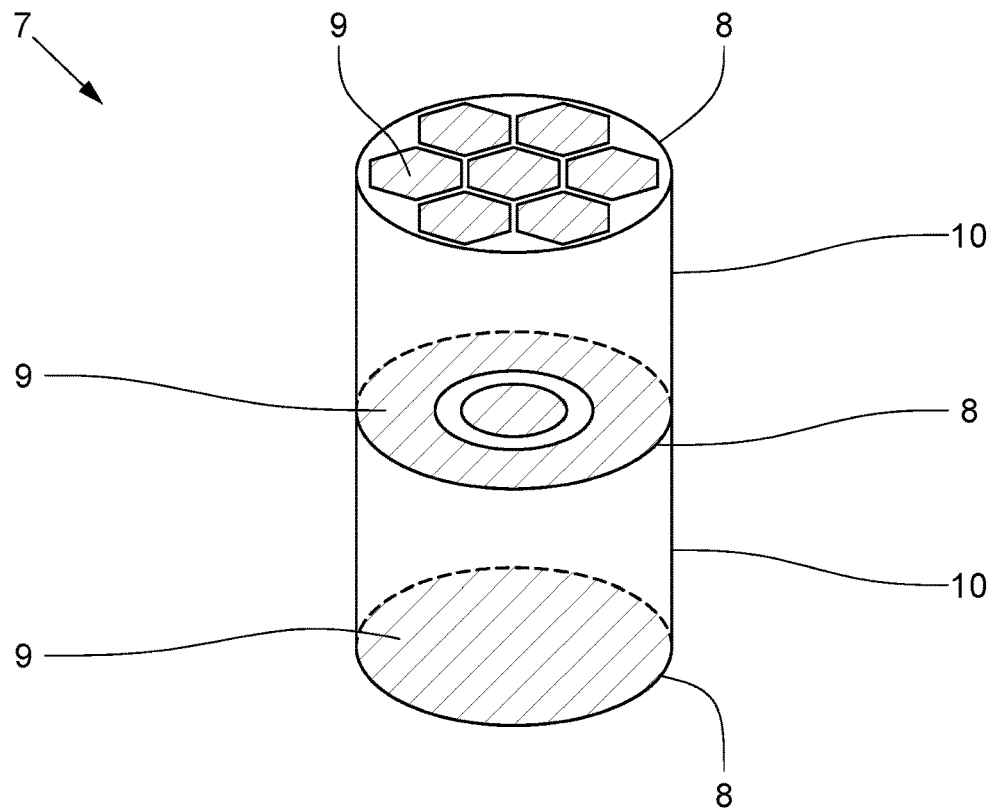
FIG. 7 illustrates a further embodiment of an electro-acoustic element according to the invention.

FIG. 7 shows another embodiment of an electro-acoustic element 7 in the form of a piezo element, wherein the electro-acoustic element 7 comprises two electro-acoustic discs 10 in the form of piezo discs. Each electro-acoustic disc 10 has an upper end face 8 and a lower end face 8, wherein the electro-acoustic discs 10 are connected to each other via the upper end face 8 of the lower electro-acoustic element 10 and the lower end face 8 of the upper electro-acoustic element 10. On the lower end face 8 of the lower electro-acoustic disc 10, an electrode 9 is arranged which is formed as a ground electrode. This electrode serves as a ground electrode for all other electrodes 9 connected to the electro-acoustic element 7. There is an outer ring electrode 9 on the upper end face 8 of the lower electro-acoustic disc 10 and another electrode arranged inside the ring electrode 9. A plurality of hexagonal electrodes 9 are disposed on the upper end face 8 of the upper electro-acoustic disc 8, which, during operation, can be controlled individually or in parallel.

During operation, either one or both electro-acoustic discs can be excited, and the beam shape of the generated ultrasonic signal can also be influenced by controlling the electrodes differently.

Figure 8:
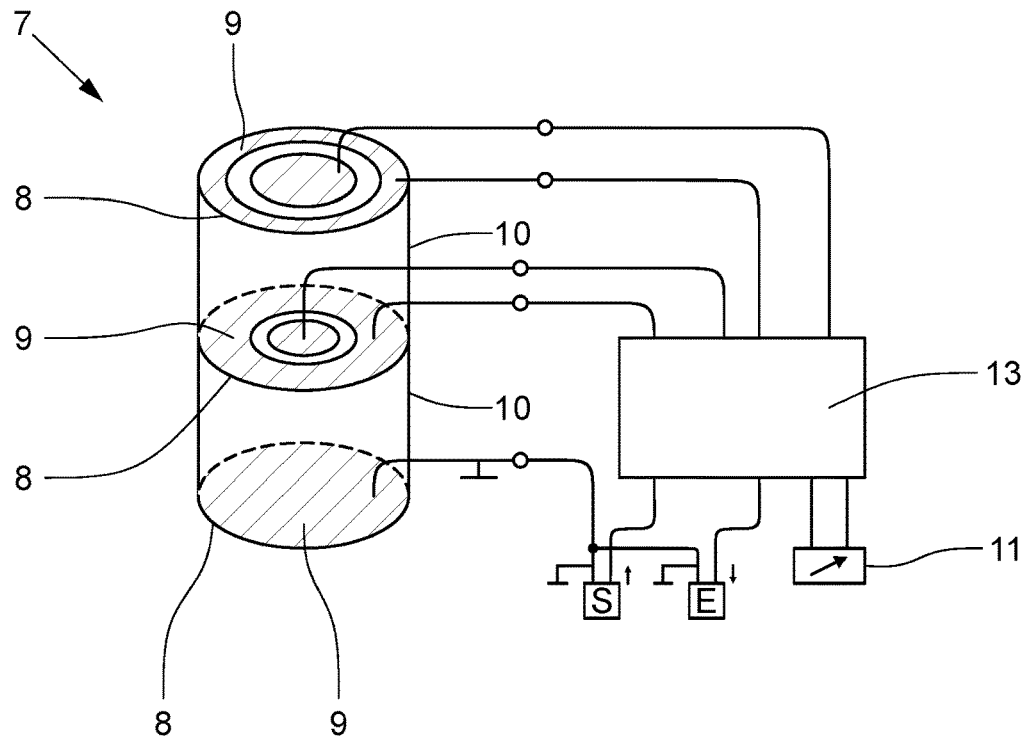
FIG. 8 illustrates a further embodiment of an electro-acoustic element according to the invention.

FIG. 8 shows a further embodiment of an electro-acoustic element 7 according to the invention, which is designed as a piezo element. The electro-acoustic element 7 also has two electro-acoustic discs 10 arranged one above the other in the form of piezo discs, wherein at least one electrode 9 is arranged on each of the end faces 7 of the electro-acoustic discs 10.

Two separately or parallel controllable electrodes 9 are arranged on the upper end face 8 of the lower electro-acoustic disc 10 and on the upper end face 8 of the upper electro-acoustic disc 10, in each case, wherein, in each case, an outer annular electrode 9 encircles an inner circular electrode 9.

During operation, a voltage for excitation of the lower electro-acoustic disc 10 is applied to at least one electrode 9 arranged on the upper end face 8 of the lower electro-acoustic disc 10 and to the electrode 9 arranged on the lower end face 8 of the lower electro-acoustic disc 10. As a result of the excitation of the lower electro-acoustic disc 10, the upper electro-acoustic disc 10 is also excited to oscillation during operation. An additional electrical load is applied between at least one electrode 9 on the lower end face 8 of the upper electro-acoustic disc 10 and at least one electrode 9 arranged on the upper end face 8 of the upper electro-acoustic disc 10, via which the oscillation of the upper electro-acoustic disc 10 can be damped during operation, so that, as a result, the resonant oscillation of the electro-acoustic element 7 can be tuned as a whole. In the illustrated embodiment, the control unit 13 is designed as a multiplexer or as a switchable matrix. As a result, by means of the embodiment shown, both the beam shape can be adjusted by the plurality of different electrodes 9 and the frequency of the generated ultrasonic signal can be influenced by the separate control of the electro-acoustic discs 10.

In addition, the illustrated electro-acoustic disc can be operated differently in transmit mode than in receive mode.

In this respect, the illustrated embodiment is particularly flexibly adjustable with respect to the characteristics of the generated ultrasonic signal.

Figure 9A:
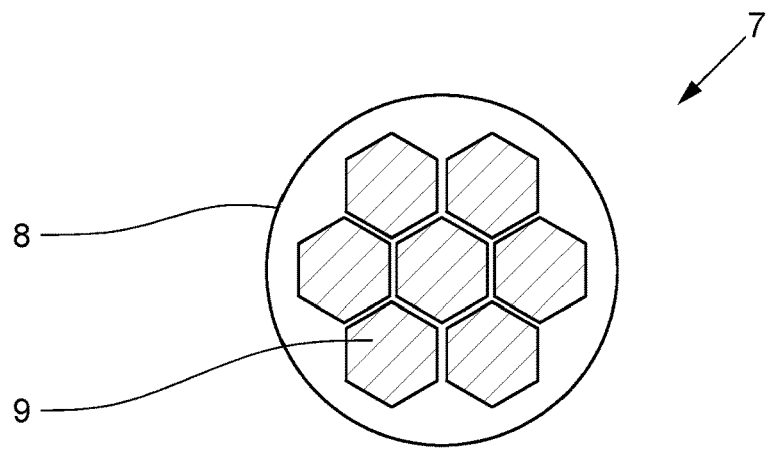
FIGS. 9a-9c illustrate top views of further electro-acoustic elements according to the invention.
Figure 9B:
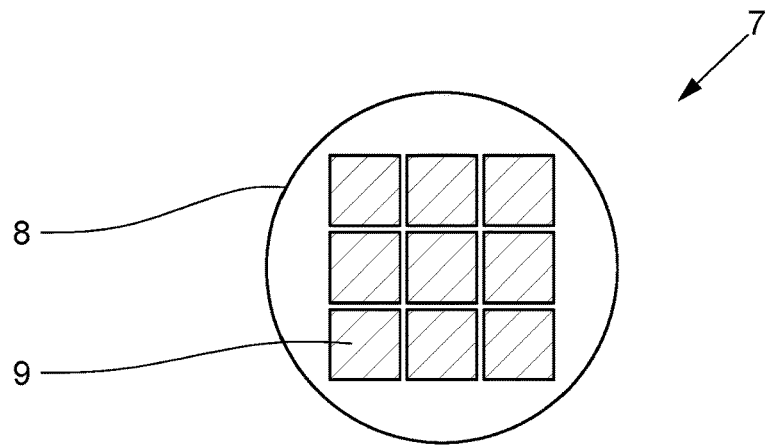
Figure 9C:
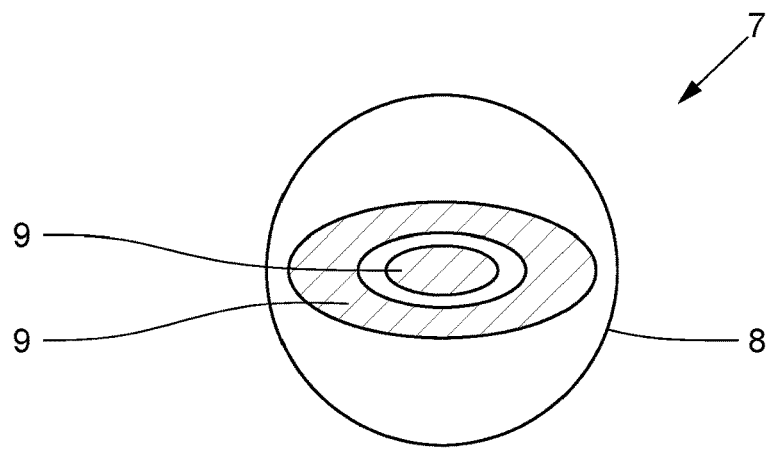

FIGS. 9a to 9c respectively show embodiments of electro-acoustic elements 7 in a top view of the upper end face 8 of an electro-acoustic disc, wherein the electrodes 9 have different shapes. In detail, FIG. 9a shows a honeycomb structure consisting of seven electrodes, wherein each individual electrode 9, which can be controlled separately, has a hexagonal shape. FIG. 9b shows a combination of nine separately controllable electrodes, wherein each individual electrode 9 is rectangular, in particular square. Both embodiments have the advantage that different combinations of electrodes 9 can be controlled in parallel. This allows a particularly large number of beam shapes to be set during operation, in particular also asymmetrical beam shapes. FIG. 9c shows an embodiment in which the electrodes 9 have an elliptical shape. According to the embodiment shown, an annular elliptical electrode 9 encircles an internal elliptical electrode 9.

Figure 10:
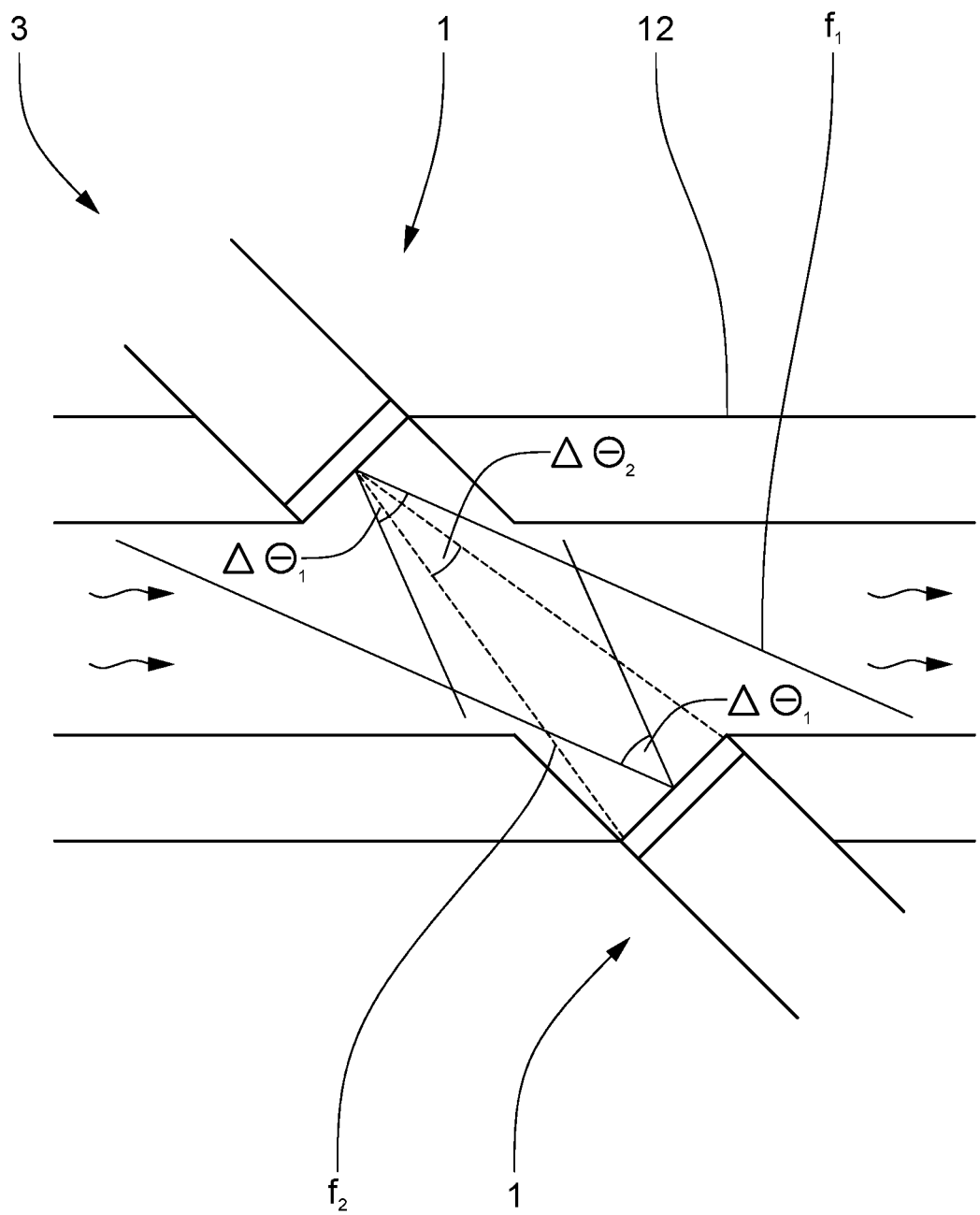
FIG. 10 illustrates an embodiment of an ultrasonic flowmeter according to the invention.

FIG. 10 shows a first embodiment of an ultrasonic flowmeter 3 according to the invention with two ultrasonic transducers 1 according to the invention. Both ultrasonic transducers 1 are designed as ultrasonic transmitters as well as ultrasonic receivers. The ultrasonic transducers 1 are arranged offset on the measuring tube 12 in such a way that an ultrasonic signal is emitted into the medium, in each case, in and against the direction of flow. Due to the design of the ultrasonic transducers according to the invention, each ultrasonic transducer can be controlled differently depending on the measurement situation and the properties of the medium to be measured. As a result, the ultrasonic transducers 1 can emit signals with two different beam widths $\Delta\Theta_1$ and $\Delta\Theta_2$ and also with two different frequencies $f_1$ and $f_2$.

In this respect, the operation of the ultrasonic flowmeter 3 can be adapted particularly flexibly to the medium and the current measurement situation.

Figure 11:
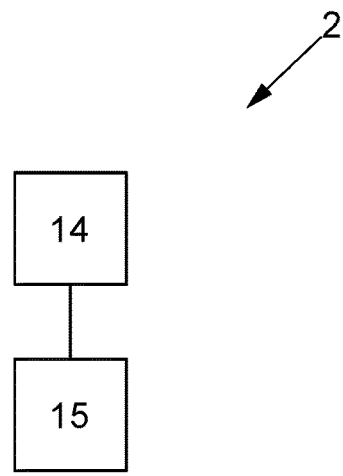
FIG. 11 illustrates an embodiment of a method according to the invention for operating an ultrasonic transducer.

FIG. 11 shows a first embodiment of a method 2 for operating an ultrasonic transducer 1 according to the invention.

In a first step, the viscosity of the medium to be measured is determined 14. Depending on the viscosity, a voltage is applied to an electro-acoustic disc 10.

With the determined voltage, the frequency of the generated ultrasonic signal is adjusted in such a way that it is 1 MHz or 2 MHz.

Alternatively to determining the viscosity of the medium, the intensity of the transmission of an ultrasonic signal can also be determined, and/or the frequency spectrum of the transmission signal can be determined. In this respect, the frequency of the ultrasonic signal can also alternatively be set in such a way that the transmission through the medium is at a maximum.

Figure 12:
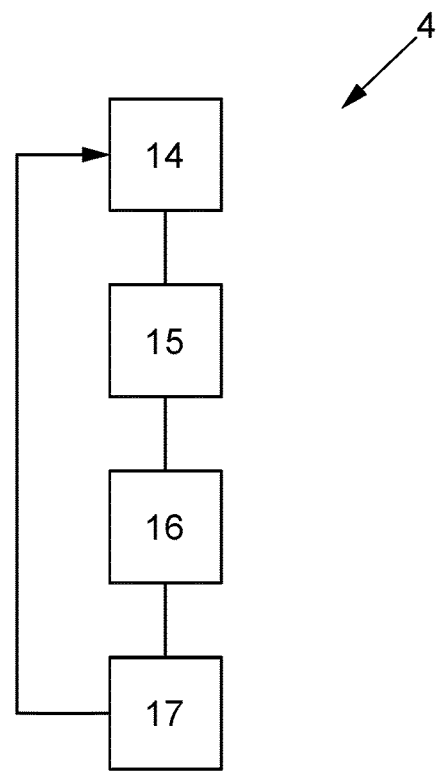
FIG. 12 illustrates an embodiment of a method according to the invention for operating an ultrasonic flowmeter.

FIG. 12 shows an embodiment of a method 4 for operating an ultrasonic flowmeter 3, wherein the ultrasonic flowmeter 3 is configured as shown in FIG. 10. In a first step 14, the viscosity of the medium is determined. Depending on the measured value of the viscosity, a voltage is applied 15 to an electro-acoustic disc 10 at each ultrasonic transducer 1, whereby the frequency of the ultrasonic signal is adjusted. The flow velocity of the medium is determined 16 from the measured transit times of the ultrasonic signals.

Depending on the measured flow velocity, the control of the electrodes 9 is switched over 17, so that the beam width is increased or decreased. In detail, either the control is switched over when the value of the flow velocity exceeds or falls below a threshold value, or alternatively or additionally the control is switched over when the transmitted intensity exceeds or falls below a threshold value.

The viscosity is then determined 14 again before a second ultrasonic signal is transmitted for determining the flow velocity.

The viscosity of the medium to be measured can be determined before each measurement, and in an alternative embodiment, the measurement is carried out at regular or irregular intervals. Further, the ultrasonic transducers may be operated at the same frequency, alternatively the ultrasonic signals may be operated at different frequencies. In this case, the individual ultrasonic transducers operate in transmit mode at frequencies different than in receive mode.

As a result, the presented method has the advantage that the operation of the ultrasonic transducers 1 and insofar the operation of the ultrasonic flowmeter 3 can be adapted to the medium and/or to the current measurement situation, so that overall the measurement process can be improved.

The invention claimed is:

1. An ultrasonic transducer for an ultrasonic flowmeter, comprising:
   an electro-acoustic element;
   a housing;
   an acoustic window; and
   a control unit;
   wherein the electro-acoustic element is arranged within the housing on the acoustic window such that, during operation, an ultrasonic signal generated by the electro-acoustic element leaves the housing through the acoustic window;
   wherein the electro-acoustic element has at least two electro-acoustic discs;
   wherein the at least two electro-acoustic discs are arranged one above the other; and
   wherein at least one electro-acoustic disc of the at least two electro-acoustic discs can be excited separately, at least temporarily, by the control unit such that influence can be exerted on the properties of the ultrasonic signal generated during operation and such that the properties of the ultrasonic signal can be adapted to be at least one of: (i) a property of the medium; and (ii) a current process situation.

2. The ultrasonic transducer according to claim 1, wherein at least one of: (i) the electro-acoustic element is a piezo element; (ii) the electro-acoustic element is a micro-mechanical element of a capacitive micro-mechanical ultrasonic transducer; (iii) at least one electro-acoustic disc of the at least two electro-acoustic discs is a piezo disc; and (iv) a micro-mechanical disc of a capacitive micro-mechanical ultrasonic transducer.

3. The ultrasonic transducer according to claim 1, wherein the at least two electro-acoustic discs each have a first and a second end face;
   wherein at least three electrodes are connected to the electro-acoustic element;
   wherein at least one electrode of the at least three electrodes is arranged on an end face of a first electro-acoustic disc or the at least two electro-acoustic discs that is facing the acoustic window;
   wherein at least one electrode of the at least three electrodes is arranged between a first and a second electro-acoustic disc of the at least two electro-acoustic discs; and
   wherein at least one electrode of the at least three electrodes is arranged on an end face of a second electro-acoustic disc of the at least two electro-acoustic discs that is facing away from the acoustic window.

4. The ultrasonic transducer according to claim 3, wherein at least two electrodes of the at least three electrodes differ in their shape and/or in their size; and
   wherein two electrodes of the at least three electrodes arranged on a same end face differ in their shape and/or in their size.

5. The ultrasonic transducer according to claim 3, wherein the control unit is designed and connected to the at least three electrodes in such a way that at least two electrodes of the at least three electrodes can be controlled at least temporarily with a different phase and/or with a different amplitude.

6. The ultrasonic transducer according to claim 1, wherein a plurality of separately controllable electrodes is present;
   wherein the plurality of separately controllable electrodes is arranged on a same end face of at least one electro-acoustic disc of the at least two electro-acoustic discs; and
   wherein the individual electrodes of the plurality of separately controllable electrodes are controllable in different combinations during operation in order to set the beam shape of the generated ultrasonic signal.

7. The ultrasonic transducer according to claim 1, wherein the at least two electro-acoustic discs have a same thickness or a different thickness.

8. The ultrasonic transducer according to claim 1, wherein the at least two electro-acoustic discs have the same material or a different material.

9. The ultrasonic transducer according to claim 1, wherein at least one electro-acoustic disc of the at least two electro-acoustic discs is connected to an adjustable inductive load and/or an adjustable capacitive load.

10. A method for operating an ultrasonic transducer in a measurement environment, the ultrasonic transducer including an electro-acoustic element, a housing, an acoustic window, and a control unit, wherein the electro-acoustic element is arranged within the housing on the acoustic window such that, during operation, an ultrasonic signal generated by the electro-acoustic element leaves the housing through the acoustic window, wherein the electro-acoustic element has at least two electro-acoustic discs, wherein the at least two electro-acoustic discs are arranged one above the other, and wherein at least one electro-acoustic disc of the at least two electro-acoustic discs can be excited separately, at least temporarily, by the control unit, the method comprising:

using the ultrasonic transducer to emit an ultrasonic signal into a medium; and controlling the at least one electro-acoustic disc of the at least two electro-acoustic discs in dependence on at least one of: (i) the viscosity of the medium and; (ii) the absorption of the generated ultrasonic signal by the medium.

11. An ultrasonic flowmeter, comprising:

a measuring tube;

an ultrasonic transducer; and a flowmeter control and evaluation unit;

wherein the ultrasonic transducer is designed at least as an ultrasonic transmitter;

wherein the ultrasonic transducer is arranged on the measuring tube in such a way that, during operation, the ultrasonic transducer emits an ultrasonic signal in the direction or opposite the direction of flow of a flowing medium into the measuring tube; and wherein the ultrasonic transducer includes at least an electro-acoustic element, a housing, an acoustic window, and a transducer control unit, wherein the electro-acoustic element is arranged within the housing on the acoustic window such that, during operation, an ultrasonic signal generated by the electro-acoustic element leaves the housing through the acoustic window, wherein the electro-acoustic element has at least two electro-acoustic discs, wherein the at least two electro-acoustic discs are arranged one above the other, and wherein at least one electro-acoustic disc of the at least two electro-acoustic discs can be excited separately, at least temporarily, by the transducer control unit such that influence can be exerted on the properties of the ultrasonic signal generated during operation and such that the properties of the ultrasonic signal generated during operation and such that the properties of the ultrasonic signal can be adapted to at least one of: (i) a property of the medium; and (ii) a current process situation.

12. The ultrasonic flowmeter according to claim 11, wherein a relationship between the viscosity of the medium to be measured and/or the absorption of the ultrasonic signal by the medium and the control of the electro-acoustic element is stored in the flowmeter control and evaluation unit.

13. The ultrasonic flowmeter according to claim 11, wherein a correlation between a value of the flow velocity and/or the viscosity of the medium to be measured, and the control of the electrodes, is stored in the flowmeter control and evaluation unit.

14. A method for operating an ultrasonic flowmeter, wherein the ultrasonic flowmeter includes at least a measuring tube, an ultrasonic transducer, and a flowmeter control and evaluation unit, wherein the ultrasonic transducer is designed at least as an ultrasonic transmitter, and wherein the ultrasonic transducer is arranged on the measuring tube in such a way that, during operation, the ultrasonic transducer an ultrasonic signal in the direction or opposite the direction of flow of a flowing medium into the measuring tube, wherein the ultrasonic transducer includes at least an electro-acoustic element, a housing, an acoustic window, and a transducer control unit, wherein the electro-acoustic element is arranged within the housing on the acoustic window such that, during operation, an ultrasonic signal generated by the electro-acoustic element leaves the housing through the acoustic window, wherein the electro-acoustic element has at least two electro-acoustic discs, wherein the at least two electro-acoustic discs are arranged one above the other, and wherein at least one electro-acoustic disc of the at least two electro-acoustic discs can be excited separately, at least temporarily, by the transducer control unit, the method comprising:

using the ultrasonic transducer to emit an ultrasonic signal into a medium; and controlling the at least one electro-acoustic disc in dependence on at least one of: (i) viscosity of the medium; and; and (ii) the absorption of the generated ultrasonic signal by the medium.

15. The method according to claim 14, wherein the ultrasonic flowmeter has at least two ultrasonic transducers;

wherein the at least two ultrasonic transducers are designed as an ultrasonic transmitter and as an ultrasonic receiver;

wherein both ultrasonic transducers are designed identically with regard to the design of the electro-acoustic element; and wherein the two ultrasonic transducers are controlled identically during operation.

16. The method according to claim 14, wherein the flowmeter control and evaluation unit controls at least two electrodes in dependence on at least one state variable, and wherein, during operation, the control of the at least two electrodes is changed in dependence on the at least one state variable.

* * * * *